United States Patent
Kobayashi et al.

(10) Patent No.: US 10,611,976 B2
(45) Date of Patent: Apr. 7, 2020

(54) THERMOCHEMICAL REGENERATION WITH SUPERADIABATIC FLAME TEMPERATURE

(71) Applicants: Hisashi Kobayashi, Bedford, NY (US); Kuang-Tsai Wu, Irvine, CA (US)

(72) Inventors: Hisashi Kobayashi, Bedford, NY (US); Kuang-Tsai Wu, Irvine, CA (US)

(73) Assignee: Praxair Technology, Inc., Danbury, CT (US)

( * ) Notice: Subject to any disclaimer, the term of this patent is extended or adjusted under 35 U.S.C. 154(b) by 214 days.

(21) Appl. No.: 15/860,754

(22) Filed: Jan. 3, 2018

(65) Prior Publication Data

US 2018/0201853 A1      Jul. 19, 2018

Related U.S. Application Data

(60) Provisional application No. 62/447,133, filed on Jan. 17, 2017.

(51) Int. Cl.

| | |
|---|---|
| *C01B 3/00* | (2006.01) |
| *C10K 3/00* | (2006.01) |
| *C01B 3/38* | (2006.01) |
| *C10K 3/06* | (2006.01) |
| *C01B 3/34* | (2006.01) |
| *C10J 1/20* | (2006.01) |
| *C01B 3/36* | (2006.01) |

(52) U.S. Cl.
CPC ............... *C10K 3/001* (2013.01); *C01B 3/34* (2013.01); *C01B 3/36* (2013.01); *C01B 3/384* (2013.01); *C10J 1/20* (2013.01); *C10K 3/06* (2013.01); *C01B 2203/0238* (2013.01); *C01B 2203/0822* (2013.01); *C01B 2203/1235* (2013.01); *C01B 2203/141* (2013.01); *C01B 2203/84* (2013.01)

(58) Field of Classification Search
CPC ...................................................... F23J 15/022
USPC ......................................... 431/11; 423/245.1
See application file for complete search history.

(56) References Cited

U.S. PATENT DOCUMENTS

| | | | |
|---|---|---|---|
| 5,113,874 A | 5/1992 | Maronian | |
| 5,210,127 A | 5/1993 | Werner et al. | |
| 5,453,259 A * | 9/1995 | D'Souza | B01D 53/0407 423/245.1 |
| 5,921,771 A | 7/1999 | Kobayashi | |
| 6,113,874 A | 9/2000 | Kobayashi | |
| 6,210,157 B1 * | 4/2001 | Kobayashi | F27D 17/001 432/181 |
| 2003/0024271 A1 * | 2/2003 | Simpson | C03B 5/193 65/134.4 |
| 2007/0129450 A1 * | 6/2007 | Barnicki | C10G 2/30 518/704 |

FOREIGN PATENT DOCUMENTS

| | | |
|---|---|---|
| WO | 2013/013875 | 1/2013 |
| WO | 2013/013875 A1 | 1/2013 |
| WO | 2016/205579 A1 | 12/2016 |

* cited by examiner

*Primary Examiner* — Avinash A Savani
(74) *Attorney, Agent, or Firm* — Donald T. Black

(57) ABSTRACT

Operation of a thermochemical regenerator at a controlled ratio of recycled flue gas to reforming fuel provides formation of fuel species that permit a higher flame temperature upon combustion of the resulting combustible mixture.

11 Claims, 3 Drawing Sheets

THERMOCHEMICAL REGENERATION WITH SUPERADIABATIC FLAME TEMPERATURE

RELATED APPLICATIONS

This application claims the benefit of U.S. Provisional Application Ser. No. 62/447,133, filed on Jan. 17, 2017, which is incorporated herein by reference.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

U.S. Pat. No. 6,113,874 discloses heat recovery methods useful with furnaces employing regenerators wherein a stream of combustion products formed in the furnace is passed through a first regenerator to heat the first regenerator and cool the combustion products, and then a portion of the cooled combustion products is combined with fuel to form a mixture which is passed through a second heated regenerator and where it undergoes an endothermic reaction to form syngas that then passes into the furnace and is combusted.

The present invention is an improvement in the methods disclosed in that patent, whereby it has unexpectedly been found that the efficient heat recovery afforded by these methods can be improved and other benefits described herein can be realized. In particular, the present invention enables the operator to obtain an adiabatic flame temperature that is higher than that of methane, thus making available the advantages that follow from having such a higher flame temperature. The aforementioned U.S. Pat. No. 6,113,874 does not teach how such a higher flame temperature can be attained in the thermochemical regeneration method described in that patent.

Flame temperature and available heat in a furnace are important properties of combustion of fuel and oxidant that influence the fuel consumption and the productivity of the furnace. Flame temperature of a fuel and an oxidant is typically defined as the thermodynamic equilibrium temperature of the combustion products without any heat loss to the surrounding and is known as adiabatic flame temperature. The actual flame temperature in an industrial furnace is significantly lower than the adiabatic flame temperature since heat is transferred from the flame to furnace charge and surrounding walls. However, an increased adiabatic flame temperature is directly correlated to an increased actual flame temperature that is realized in operation of a furnace such as furnaces with which the present invention can be practiced. Available heat of a fuel in a furnace is typically defined as the percent of the lower heating value (LHV) of the fuel available in the furnace for heat transfer to the furnace charge and the furnace walls and calculated as the difference of the furnace fuel input (LHV) and the sensible heat of flue gas exiting the furnace. In general higher flame temperature correlates with higher available heat for most fuel-oxidant systems. It is well known that both flame temperature and available heat increase substantially when oxygen is used in place of air for combustion. For example oxy-acetylene flame produces a very high temperature and is widely used for welding of metals. If acetylene is used as a fuel in place of natural gas in an industrial furnace such as a glass furnace, the fuel efficiency is improved substantially because of its high available heat. Due to the very high cost of acetylene, however, it is not considered as a practical fuel for industrial furnace applications. There is a need to improve the properties of common hydrocarbon fuels such as natural gas to increase the flame temperature and available heat for industrial furnace applications.

BRIEF SUMMARY OF THE INVENTION

One aspect of the present invention is a method of carrying out combustion in a furnace, comprising
(A) combusting fuel in a furnace to produce gaseous combustion products, and
(B) alternately (1) (i) passing gaseous combustion products from the furnace into and through a cooled first regenerator to heat the first regenerator and cool said gaseous combustion products,
(ii) passing at least a portion of said cooled gaseous combustion products from said first regenerator, and hydrocarbon fuel, into a heated second regenerator, at a reforming reaction stoichiometric ratio of said cooled gaseous combustion products to said hydrocarbon fuel of less than 1 and preferably less than 0.5,
(iii) reacting the gaseous combustion products and the fuel in the second regenerator in an endothermic reaction under conditions effective to form syngas comprising hydrogen and carbon monoxide and to form C2 species selected from the group consisting of $C_2H_4$, $C_2H_2$, and mixtures thereof which is combined in the syngas, and thereby cooling the second regenerator; and
(iv) passing said syngas and C2 species from said second regenerator into said furnace and combusting them in the furnace with one or more oxidant streams injected into said furnace; and
(2) (i) passing a portion of the gaseous combustion products from the furnace into and through a cooled second regenerator to heat the second regenerator and cool said portion of the gaseous combustion products,
(ii) passing at least a portion of said cooled portion of gaseous combustion products from said second regenerator, and hydrocarbon fuel, into a heated first regenerator, at a reforming reaction stoichiometric ratio of said cooled gaseous combustion products to said hydrocarbon fuel of less than 1 and preferably less than 0.5,
(iii) reacting the gaseous combustion products and the fuel in the first regenerator in an endothermic reaction under conditions effective to form syngas comprising hydrogen and carbon monoxide and to form C2 species selected from the group consisting of $C_2H_4$, $C_2H_2$, and mixtures thereof which is combined in the syngas, and thereby cooling the first regenerator, and
(iv) passing said syngas and said C2 species from said first regenerator into said furnace and combusting them in the furnace with one or more oxidant streams injected into said furnace.

In preferred practice, soot and carbon particles deposited on checker surfaces are gasified during the purge step with recycled flue gas containing $O_2$, $H_2O$ and $CO_2$. Preferably the purge gas contains at least 1% $O_2$ by volume, more preferably more than 2%. More preferably, oxygen containing gas is added to the recycled flue gas to increase the $O_2$ concentration of the purge gas in order to accelerate the oxidation reactions of deposited soot.

DETAILED DESCRIPTION OF THE INVENTION

Figure 1:
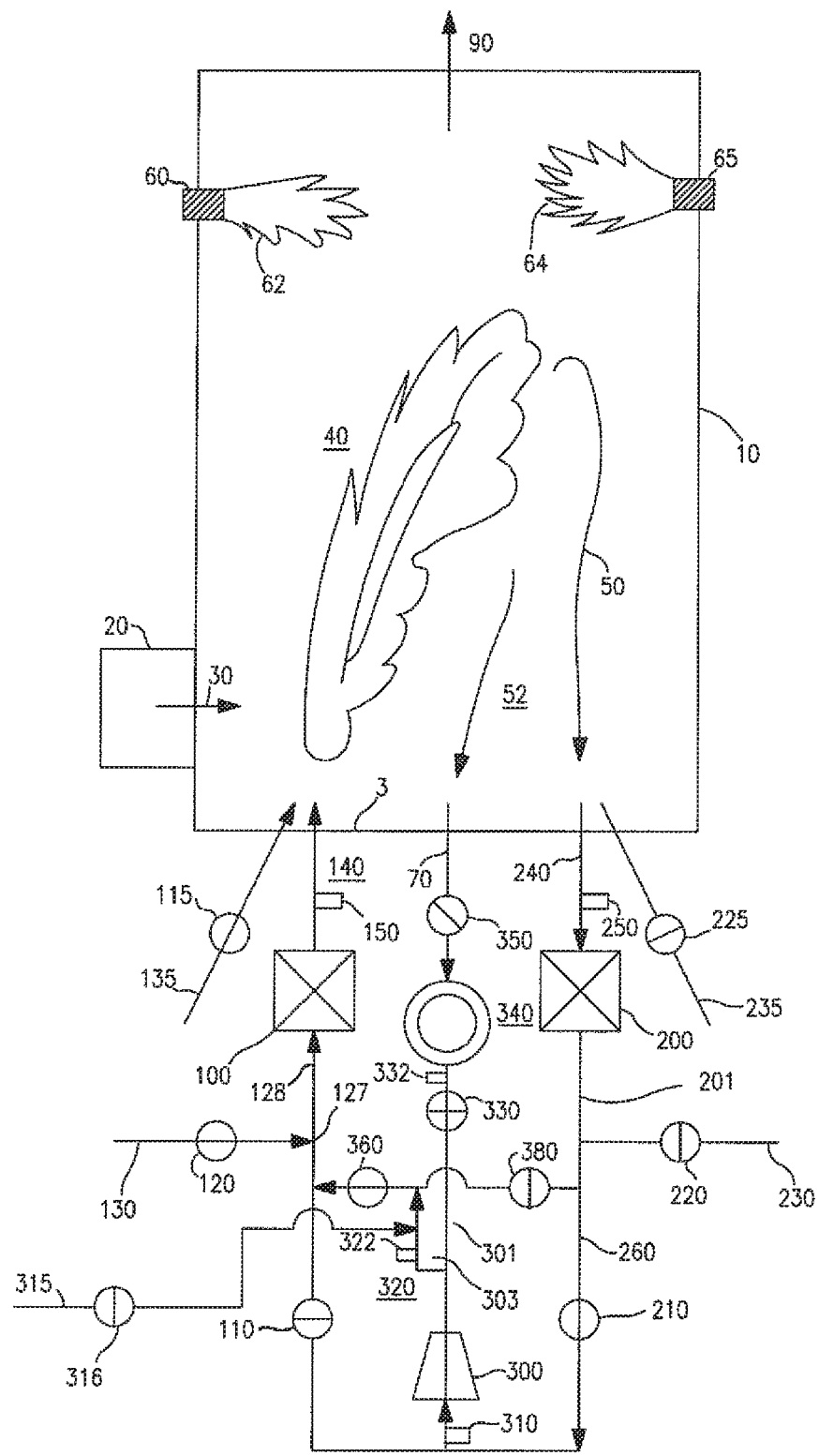
FIGS. 1-3 are schematic representations of different aspects of the present invention.

In high temperature industrial furnaces such as glass, steel and aluminum melting furnaces, the efficiency of melting or heating is enhanced by selecting fuel and oxidant combinations that provide a high flame temperature. It is well known that oxy-fuel combustion increases the flame temperature substantially as compare to combustion with air. Many glass melting furnaces are fired with natural gas and oxygen because of high fuel efficiency and low emissions of pollutants such as NOx. Since the main mode of heat transfer in high temperature furnaces is radiation, heat transfer rate from a flame is increased sharply when the flame temperature is increased. Commonly used fuels for industrial furnaces are natural gas and fuel oils. Typical natural gas contains more than 90% methane and the combustion property of natural gas is very similar to the combustion property of pure methane. This invention solves the challenge of obtaining high flame temperature by using common fuels (such as methane and natural gas) to achieve higher flame temperatures than the normal adiabatic flame temperature for combustion of methane or natural gas, i.e., to produce superadiabatic flame temperatures.

The invention is described herein in particular detail with respect to a preferred type of furnace, namely one that employs a heat recovery process (referred to as thermochemical regeneration or "TCR") which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). According to the present invention, it has been discovered that control of the ratio of recycled flue gas to reforming fuel unexpectedly enables formation of a syngas-based fuel that has a higher flame temperature than would be expected. In the following description, pure methane ($CH_4$) is described as reforming fuel for purposes of illustration. Other satisfactory fuels include any combustible gas, gas mixture, or vaporized liquid fuels including, but not limited to, natural gas, propane, and LPG (liquefied petroleum gas).

In the reforming cycle, in general, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including $H_2$ and CO. The reforming reactions are endothermic and the heat needed to promote the reforming reactions is absorbed from the heated checker. The reforming reactions produce a gaseous composition, which typically comprises one or more components such as such as $H_2$, CO, and unreacted gases comprising $H_2O$, $CO_2$ and $CH_4$. This gaseous composition thus produced may also be called "syngas" herein. In accordance with the present invention, soot as well as C2 species are also formed, such as C2H4 and/or C2H2 and/or mixtures thereof.

The mixture of gaseous products emerges from the second regenerator into the furnace wherein the combustible gaseous components are combusted with oxidant to provide thermal energy for heating and/or melting material in the furnace.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The method of the present invention can be expected to boost the energy content of the fuel-oxidant mixture that is fed into the furnace for combustion, by more than 120 Btu per 1 scf of reforming fuel as CH4 or 120 Btu per 900 Btu LHV of reforming fuel. In the regenerative bed some of the alkane hydrocarbons (such as CH4, and C2H6) in natural gas are converted into hot fuel species that produce a flame temperature much higher than that of methane. However, adapting that discovery to the thermochemical regenerator process disclosed in U.S. Pat. No. 6,113,874 in which flue gas is recycled through another regenerator did not lead to the desired higher flame temperature.

Now it has been discovered that a superadiabatic flame temperature, i.e., above the adiabatic flame temperature of the combustion of natural gas and oxygen, can be obtained in the combustion in the furnace of syngas produced from the regenerator according to the thermochemical regeneration methodology of the present invention when the amount of flue gas from the furnace (RFG) that is mixed with natural gas (RF) is controlled at a reforming reaction stoichiometric ratio of RFG to RF of less than 1 and preferably less than 0.5, while providing heat to the mixture in the regenerator beds.

The reforming reaction stoichiometric ratio is established as follows.

The reforming fuel RF includes one or more hydrocarbons any of which may optionally also contain oxygen. Taking into account the total content of all such compounds in the RF, the hydrocarbon compound content of the RF corresponds to the general formula $C_xH_yO_z$ wherein x is greater than z and z may be zero. Of course, other products may also be present in the RF such as nitrogen, argon, and/or compounds of nitrogen and/or of sulfur.

The recycled flue gas RFG includes water vapor (H2O), carbon dioxide (CO2), oxygen (O2), and typically also other products such as nitrogen, argon, and/or compounds of nitrogen and/or of sulfur.

The calculation of the reforming reaction stoichiometric ratio is based on complete conversion of all compounds in the RF to carbon monoxide and hydrogen by reaction with H2O, CO2 and O2 present in the RFG, bearing in mind that of course that conversion will be accompanied by conversion of H2O, CO2 and O2 present in the RFG. The reforming reaction stoichiometric ratio is thus defined as the ratio of the total amount (in moles) of H2O, CO2 and O2 from the RFG that is present in the mixture of RFG and RF, to the amount (in moles) of H2O, CO2 and O2 that would be required for complete conversion of all compounds of the formula CxHyOz to carbon monoxide and hydrogen.

Thus, given RFG that contains a moles of H2O, b moles of CO2 and c moles of O2, the reforming reaction stoichiometric ratio (RRSR) is $$RRSR = (x-z)/(a+b+2c)$$

The reforming reaction stoichiometric ratio is defined as 1 when the total moles of H2O, CO2 and O2 in RFG fully react with RF to convert all of fuel species in RF to CO and H2. For example if the RF is CH4 and the RFG is 1/3 CO2+2/3 H$_2$O with pure oxy-fuel combustion, then the reforming reaction stoichiometric ratio of 1 corresponds to 1 mole of RFG (i.e., 1/3 CO2+2/3 H2O) mixed with 1 mole of RF (i.e., CH4). If the reforming fuel is C3H8 and the RFG is 3/7 CO2+4/7 H$_2$O with pure oxy-fuel combustion, then the reforming stoichiometric ratio of 1 corresponds to 3 moles of RFG (i.e., 9/7 CO2+12/7 H$_2$O) mixed with 1 mole of RF (i.e., C3H8). When the RFG contains O2, then each mole of O2 is assumed to partially oxidize RF to form CO and H2 only (e.g., CH4+1/2 O2->CO+2H2).

The resulting converted stream contains significant fractions of ethylene (C2H4), acetylene (C2H2) and soot (carbon) in addition to H2 and CO and produces a superadiabatic flame temperature upon combustion in the furnace. The regenerator bed is cyclically heated by the hot flue gas from the furnace.

The operation and control of the present invention is described in more detail below in conjunction with FIGS. 1 to 3. An end-port fired glass furnace (10) fitted with two regenerators in end wall (3) is used as an example.

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
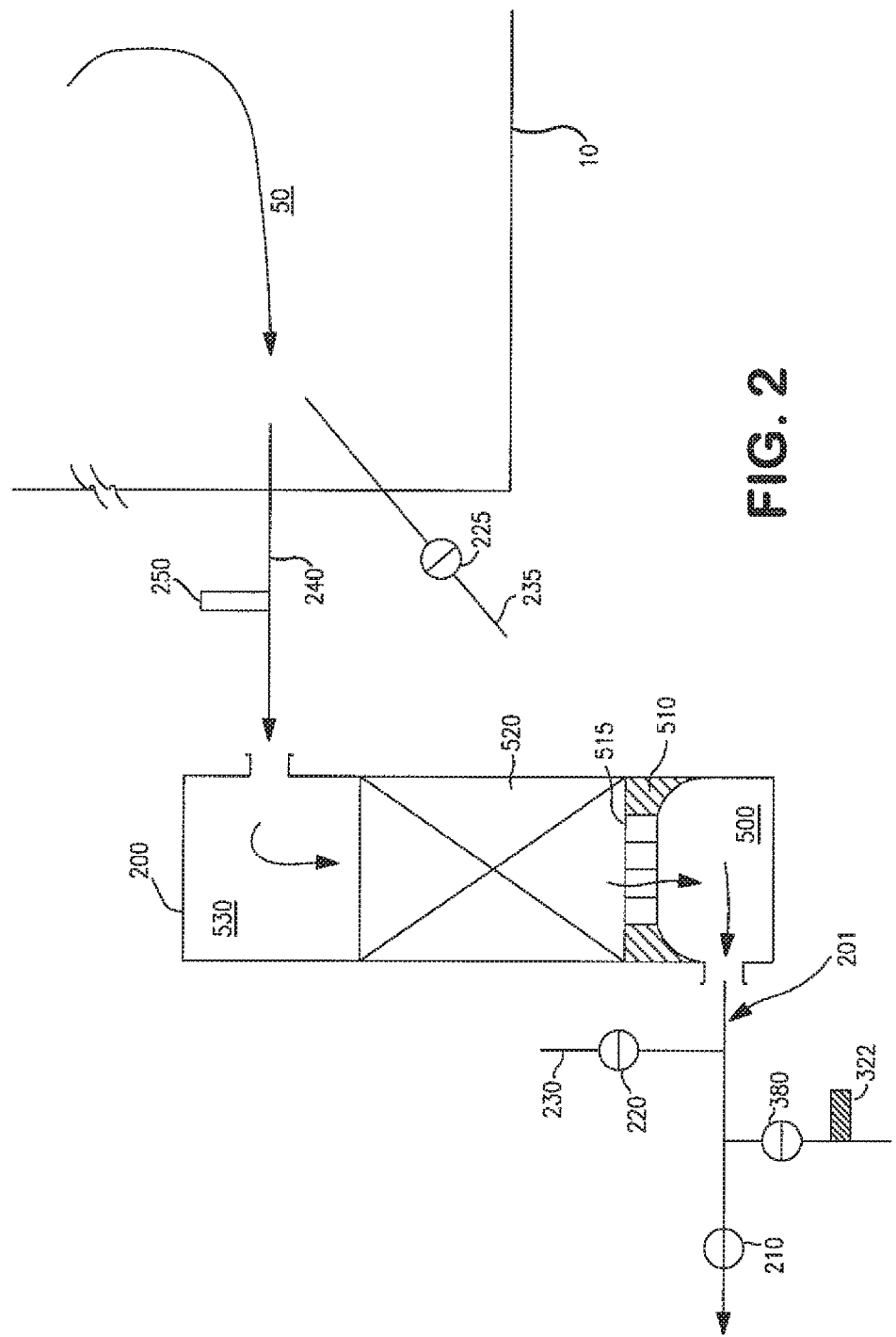

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Suitable reforming fuels include methane (which is preferred) as well as any other combustible gas, gas mixture, or vaporized liquid fuels including, but not limited to, natural gas, propane, and LPG (liquefied petroleum gas).

Figure 3:
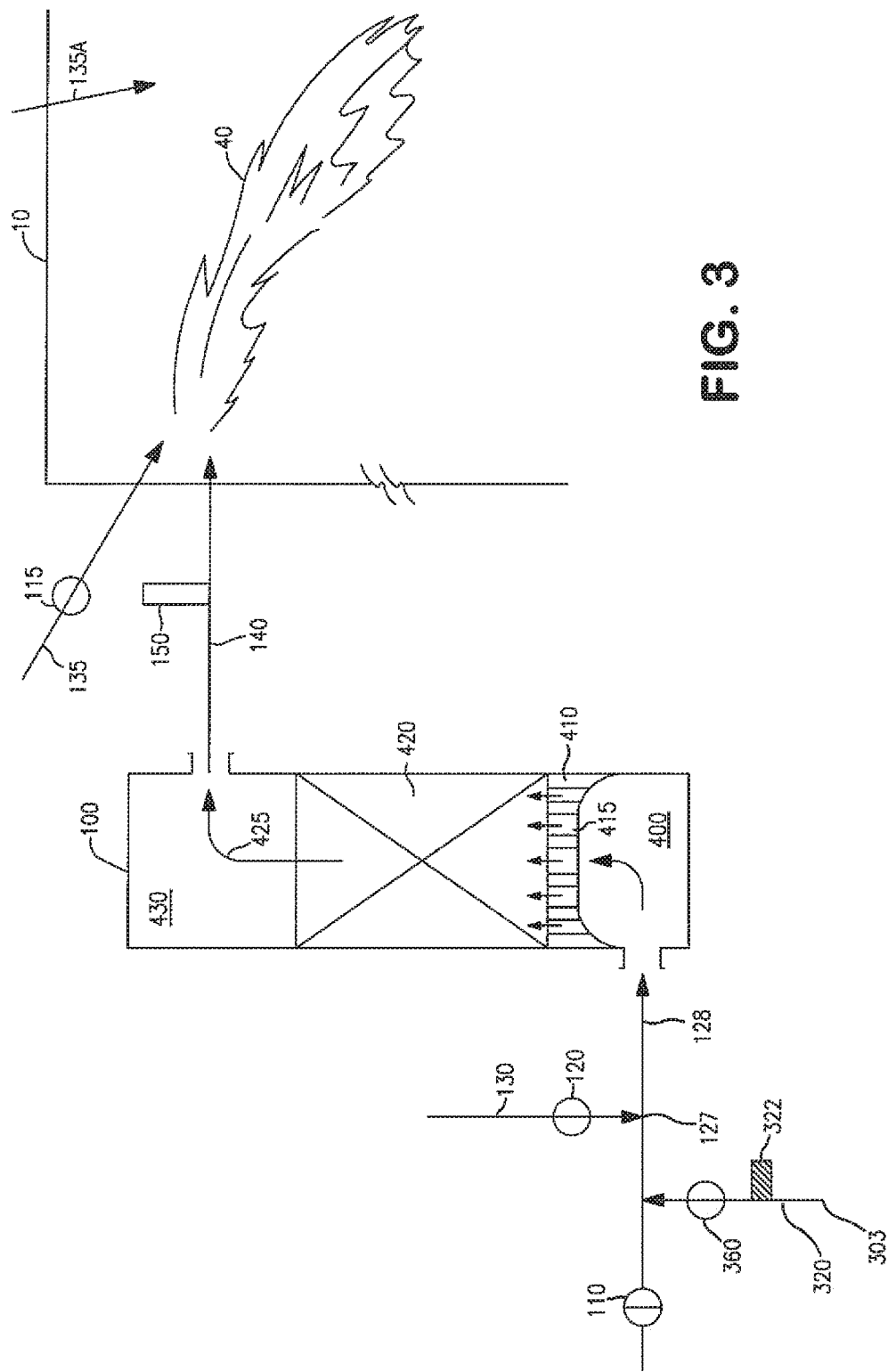

As seen in FIG. 3, the reforming fuel (RF) from stream (130) intersects and mixes with the RFG (303) at location (127) in conduit (128) which also communicates with the bottom space (400) of regenerator (100). The RFG/RF mixture that is formed at this stage must exhibit a reforming reaction stoichiometric ratio of RFG to RF of less than 1 and preferably less than 0.5. This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. CH4) reacts with CO2 and H2O in the RFG and forms CO, H2, and soot. The required heat for the endothermic reforming and soot-forming reactions is taken from the heated checkers. The reforming reaction continues as the RFG/RF mixture continues to travel toward the top space (430). The gaseous, soot-containing stream (425) (referred to herein as a "reformed" or "syngas" gas stream) exits from the top of checker pack (420). Stream (425) has high temperature and may include species such as CO, H$_2$, soot, unreacted CH$_4$, and unreacted CO$_2$ and H$_2$O. It also contains amounts of C2 species namely C2H4 and/or C2H2 and/or mixtures thereof. The stream (425) passes through port neck (140) and oxygen sensor (150), and enters furnace (10). This stream exits checker pack (420) at temperatures for example ranging from 1800 F to 2500 F. Preferably, the combined concentration of CO2 and H2O in the heated syngas that is formed in this manner is less than 20 vol. %, more preferably less than 10 vol. %.

Oxidant for combustion of the syngas is supplied by a conduit (135) with an opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %. Preferably, the oxidant is preheated before it is fed to the furnace. Reheating can be accomplished by passing the oxidant through a preheated recuperator or regenerator. The typical preheat temperature of the oxidant in a recuperator is between 300 C to 800 C and the typical preheat temperature of the oxidant in a regenerator is between 1000 C to 1300 C.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. Remaining syngas in regenerator (100) is purged by the RFG for a specified amount of time so that nearly all the syngas in the regenerator is expelled to the furnace and combusted to completion. Purging with the RFG is a critical step in this invention to prevent build-up of carbon on checker surfaces since the syngas from this invention contains significant fractions of ethylene ($C_2H_4$), acetylene ($C_2H_2$) and soot (mostly carbon). These species are susceptible to deposit soot and carbon particles on checker surfaces. $O_2$, $H_2O$ and $CO_2$ in RFG react with soot and carbon particles deposited on checker surfaces and gasify them during the purging step.

Preferably the purge gas contains some $O_2$, since $O_2$ has a higher gasification reaction rate than $H_2O$ and $CO_2$. Oxygen containing gas can be added to the recycled flue gas to increase the $O_2$ concentration of the purge gas in order to accelerate the oxidation reactions of deposited soot.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas must also exhibit at a reforming reaction stoichiometric ratio of RFG to RF of less than 1 and preferably less than 0.5. This mixture undergoes in regenerator (200) the endothermic reforming and the reactions to form C2 species and soot, which had occurred in regenerator (100) in the previous cycle as described herein, to produce stream (425) of syngas and C2 species and soot which passes into furnace (10) where it is combusted with oxidant (235) that is fed through valve (225).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (i.e. (100) or (200) as the case may be) is undergoing the purging sequence described above. For maximum heat recovery, it is preferred that burners (60) and (65) are not co-firing with the syngas flame (40). It is also preferred that during the purging sequence, burners (60) and (65) are not firing.

Thus, the present inventor has found the conditions under which a superadiabatic flame temperature can be attained. These conditions typically provide greater than 120 Btu preheat energy per 1 scf of reforming fuel input in the regenerator that is in the reforming cycle. Optionally, but preferably, heat is also provided to the oxidant stream. It is preferable to heat both fuel and oxidant streams in regenerators for maximum heat recovery from the hot flue gas exiting the furnace.

In the following sections the benefits of the present invention are presented by comparing the flame temperature and available heat of different fuels and the syngas fuel of the present invention. Table 1 below shows calculated flame temperature and available heat above 2700 F of combustion products for several pure fuels combusted with pure oxygen at 103% of combustion stoichiometric condition at 1 atmosphere. Oxy-acetylene flame temperature is one of the highest among hydrocarbon fuels and is the reason why it is widely used for welding of metals. In general higher flame temperature correlate with higher available heat for most fuel-oxidant systems, as shown in the Table. (From the above definitions the available heat of combustion becomes zero when the furnace temperature reaches the adiabatic flame temperature.)

TABLE 1

Adiabatic Flame Temperature and Available Heat above 2700 F.

| | Fuel | | | |
|---|---|---|---|---|
| | Methane | Propane | Hydrogen | Acetylene |
| Flame temperature, ° F. | 5033 | 5106 | 5082 | 5540 |
| Available Heat, % of LHV | 77.5 | 80.8 | 72.5 | 91.6 |

In high temperature industrial furnaces such as glass, steel and aluminum melting, the efficiency of melting or heating is enhanced by selecting fuel and oxidant combination that provides a high flame temperature. It is well known that oxy-fuel combustion increases the flame temperature substantially as compare to combustion with air. Many glass meting furnaces are now fired with natural gas and oxygen because of high fuel efficiency and low emissions of pollutants such as NOx. Since the main mode of heat transfer in high temperature furnaces is radiation, heat transfer rate from a flame is increased sharply when the flame temperature is increased. Most common fuels used for industrial furnaces are natural gas and fuel oils. Typical natural gas contains more than 90% methane and the combustion property of natural gas is very similar to the combustion property of pure methane. Other fuels such as hydrogen, acetylene significantly increase the flame temperature and hence beneficial. Hydrogen and acetylene, however, are much more expensive than natural gas and they are not currently used as the fuel for most industrial furnace applications. This invention upgrade the available heat of common fuels such as natural gas to the available heat level of acetylene and also produces super adiabatic flame temperatures.

The flame temperature and the available heat can be increased by adding energy to the fuel and/or oxidant prior to combustion. Table 2 shows increases in flame temperature and available heat above 2700 F by adding preheat energy to fuel and/or oxygen. When room temperature methane ($CH_4$) and oxygen is combusted at 103% of stoichiometric ratio the calculated adiabatic flame temperature is about 5033 F and the available heat is 77.5% of LHV of CH4 input (Case 1). Lower heating value (LHV) of methane is 894 Btu/scf, where scf is standard cubic feet measured at 70 F.

TABLE 2

Increases in flame temperature and available heat above 2700 F. of methane and oxygen combustion with additional preheat energy to fuel and/or oxygen

| Case Number | Case 1 | Case 2 | Case 3 | Case 4 | Case 5 | Case 6 |
|---|---|---|---|---|---|---|
| Preheat energy Btu/1 scf CH4 | 0.0 | 40.0 | 80.0 | 120.0 | 160.0 | 200.0 |
| Flame temperature, ° F. | 5033 | 5091 | 5147 | 5200 | 5252 | 5301 |
| Available Heat, % of LHV | 77.5 | 82.1 | 86.8 | 91.4 | 96.1 | 100.7 |

Table 2 shows that the flame temperature and available heat are increased by 58 to 49 F and 4.6 to 4.7% respectively for every 40 Btu of preheat energy added per 1 scf of CH4. Although the flame temperature even with 200 Btu/scf CH4 of additional preheat energy (Case 6) is still below the flame temperature of acetylene (5540 F), the available heat becomes equivalent to that of acetylene (91.6%) with a preheat energy of 120 Btu/scf CH4 (Case 4). Increasing the available heat from 77.5% to 91.4% provides 15.2% fuel and oxygen savings in this example.

There are different options for adding preheat energy to fuel and oxidant. Both fuel and oxidant can be preheated by heat exchangers such as recuperators and regenerators by hot fluids such as hot flue gas from the furnace (Ref. WO2013013875A1, U.S. Pat. No. 5,921,771) or from a separate furnace (Ref. U.S. Pat. No. 6,210,127). It is also possible to add the preheat energy by electrical heating. The most economically practical method is to preheat fuel and/or oxidant by the hot flue gas from the furnace in which the fuel and the oxidant are combusted. For example high temperature recuperators can be used to preheat both oxygen and fuel to achieve a super adiabatic flame temperature condition. However, the maximum amount of heat added to the fuel and oxidant streams are less than 120 Btu per 1 scf of NG, limited by the maximum service temperature of heat exchanger materials available. The maximum practical gas preheat temperatures are about 450 C (842 F) for natural gas and 550 C (1022 F) for oxygen. (Ref. WO2013013875A1).

The sensible heat of 1 scf of methane at 842 F and 2 scf of oxygen at 1022 F are about 22 Btu and 37 Btu respectively. Thus the total combined preheat energy input by practical recuperators is limited to about 60 Btu/scf of methane. Higher gas preheating temperatures can be achieved by using regenerators made of refractory materials. U.S. Pat. No. 5,921,771 teaches preheating of oxygen in regenerators. At an oxygen preheat temperature of 2400 F, 98 Btu is added for 2 scf of O2. Preheating of natural gas above about 900 F is hitherto believed to be impractical due to cracking of fuel species to form soot particles which causes fouling of heat exchangers. Thus the practical maximum preheat energy achievable by combining regenerative heating of oxygen and recuperative heating of fuel was believed to be below 120 Btu for 1 scf of CH4 and 2 scf of O2. With the present invention (represented as Cases 4 to 6) the available heat methane can be increased above that of acetylene.

The thermochemical regenerator process disclosed in U.S. Pat. No. 6,113,874 teaches a method to add more energy to the fuel stream by using endothermic chemical reactions. In order control the soot formation and the resulting heat exchanger fouling problems it teaches recycling a portion of flue gas and mixing it with natural gas. The recycled flue gas-natural gas mixture is heated in the regenerator to promote endothermic reforming reactions to produce hydrogen and carbon monoxide. Recycling a large amount of flue gas, however, increases the concentration of CO2 and H2O in the syngas, and was found to reduce the flame temperature significantly and reduces the heat transfer efficiency in the furnace. Table 3 shows the effects of flue gas recycle into the fuel stream on flame temperature and available heat while adding 160 Btu of energy per 1 scf of CH4 as the fuel.

TABLE 3

Flame temperature and available heat with flue gas recycle and with a preheat energy input of 160 Btu/scf of fuel

| | Case Number | | | | |
|---|---|---|---|---|---|
| | Case 5 | Case 7 | Case 8 | Case 9 | Case 10 |
| Flue gas recycle ratio, mol/mol fuel | 0 | 0.5 | 1 | 1.5 | 1.5 |
| Temperature of flue gas | 77 | 77 | 77 | 77 | 2700 |
| Flame temperature, ° F. | 5252 | 5148 | 5042 | 4932 | 5085 |
| Available Heat, % of LHV | 96.1 | 90.0 | 83.9 | 77.8 | 96.1 |

When 0.5 scf of flue gas cooled to room temperature is recycled and mixed to 1 scf of fuel and 160 Btu of heat is added to the mixture the flame temperature is reduced from 5252 F to 5148 F and the available heat is reduced from 96.1% to 90.0%. When 1.5 scf of flue gas cooled to room temperature is mixed to 1 scf of fuel and 160 Btu of heat is added to the mixture the flame temperature is further reduced from to 4932 F and the available heat is reduced to 77.8%. A comparison of these results with the baseline conditions without preheat energy addition and flue gas recycle (See column 1 of Table 2) shows that the benefits of 160 Btu of heat addition were negated by the recycling of 1.5 scf of cooled flue gas. (I.e., Both flame temperature and available heat became comparable.) The cooling effect of recycled flue gas can be partly offset by hot recycling. In column 5 of Table 5 show an ideal case of recycling flue gas at the flue gas exit temperature of 2700 F. The available heat becomes the same as the zero-recycle case under this assumption. However, the flame temperature is reduced by 167 F since the temperature of recycled flue gas is still much lower than the flame temperature. In a practical case of preheating fuel and/or oxidant with hot flue gas from a furnace the recycled flue gas temperature is that of the cooled flue gas temperature after the heat exchanger and is likely to be in a range of 500 F to 1500 F.

The present invention provides numerous benefits.

It has been determined that, quite unexpectedly, the method of the present invention enables combustion in the furnace at a higher adiabatic flame temperature than is expected upon combustion of natural gas or methane. This higher flame temperature in turn improves the overall heat transfer rate to the material in the furnace that is being heated or melted. As a result of the method of the present invention, the amount of reactants contained in RFG for the reforming reaction is limited below the reforming reaction stoichiometric ratio of 1, which promotes the formation of ethylene (C2H4), acetylene (C2H2) and soot (mostly carbon) and minimize the excess CO2 and H2O in the syngas. The resulting syngas produces a superadiabatic flame temperature and a high available heat upon combustion in the furnace.

What is claimed is:

1. A method of carrying out combustion in a furnace, comprising
   (A) combusting fuel in a furnace to produce gaseous combustion products, and
   (B) alternately (1) (i) passing gaseous combustion products from the furnace in which the gaseous combustion products were produced in step (A) into and through a cooled first regenerator to heat the first regenerator and cool said gaseous combustion products,
   (ii) passing at least a portion of said cooled gaseous combustion products from said first regenerator, and hydrocarbon fuel, into a heated second regenerator, at a reforming reaction stoichiometric ratio of said cooled gaseous combustion products to said hydrocarbon fuel of less than 1,
   (iii) reacting the gaseous combustion products and the fuel in the second regenerator in an endothermic reaction under conditions effective to form syngas comprising hydrogen and carbon monoxide and to form C2 species selected from the group consisting of C2H4, C2H2, and mixtures thereof which is combined in the syngas, and thereby cooling the second regenerator; and
   (iv) passing said syngas and C2 species from said second regenerator into said furnace in which the gaseous combustion products were produced in step (A) and combusting them in the furnace with one or more oxidant streams injected into said furnace; and
   (2) (i) passing a portion of the gaseous combustion products from the furnace in which the gaseous combustion products were produced in step (A) into and through a cooled second regenerator to heat the second regenerator and cool said portion of the gaseous combustion products,
   (ii) passing at least a portion of said cooled portion of gaseous combustion products from said second regenerator, and hydrocarbon fuel, into a heated first regenerator, at a reforming reaction stoichiometric ratio of said cooled gaseous combustion products to said hydrocarbon fuel of less than 1,
   (iii) reacting the gaseous combustion products and the fuel in the first regenerator in an endothermic reaction under conditions effective to form syngas comprising hydrogen and carbon monoxide and to form C2 species selected from the group consisting of C2H4, C2H2, and mixtures thereof which is combined in the syngas, and thereby cooling the first regenerator, and
   (iv) passing said syngas and said C2 species from said first regenerator into said furnace in which the gaseous combustion products were produced in step (A) and combusting them in the furnace with one or more oxidant streams injected into said furnace.

2. A method according to claim 1 wherein the reforming reaction stoichiometric ratio in steps (B)(1)(ii) and (B)(2)(ii) is less than 0.5.

3. A method according to claim 1 wherein the oxidant with which the syngas and C2 species are combusted in the furnace has been preheated to a temperature above ambient.

4. A method according to claim 1 wherein the combined concentration of CO2 and H2O in the syngas that is formed in said endothermic reactions is less than 20 vol. %.

5. A method according to claim 1 wherein the combined concentration of CO2 and H2O in the syngas that is formed in said endothermic reactions is less than 10 vol. %.

6. A method according to claim 1 wherein the combined concentration of CO2 and H2O in the syngas that is formed in said endothermic reactions is less than 5 vol. %.

7. A method according to claim 1 wherein the combined energy added to the gaseous combustion products and to the fuel that are fed to said endothermic reactions and to the oxidant with which the syngas and C2 compounds are combusted is more than 120 Btu per 900 Btu of fuel input to the regenerators.

8. A method according to claim 1 further comprising gasifying soot and carbon particles deposited on checker surfaces inside said regenerators with purge gas that comprises recycled gaseous combustion products containing O2, H2O and CO2.

9. A method according to claim 8 wherein the purge gas contains at least 1% O2 by volume.

10. A method according to claim 8 wherein the purge gas contains more than 2% O2 by volume.

11. A method according to claim 8 wherein oxygen containing gas is added to the recycled gaseous combustion products to increase the O2 concentration of the purge gas in order to accelerate the oxidation reactions of deposited soot.

* * * * *